United States Patent
Anderson et al.

(10) Patent No.: US 11,803,507 B2
(45) Date of Patent: Oct. 31, 2023

(54) DATA STREAM PROTOCOL FIELD DECODING BY A SYSTOLIC ARRAY

(71) Applicant: Securion Systems, Inc., Centerville, UT (US)

(72) Inventors: Jordan Anderson, Centerville, UT (US); Timothy Paul Abel, Fruit Heights, UT (US); Derek Owens, Centerville, UT (US); Sean Little, North Salt Lake, UT (US)

(73) Assignee: SECTURION SYSTEMS, INC., Centerville, UT (US)

( * ) Notice: Subject to any disclaimer, the term of this patent is extended or adjusted under 35 U.S.C. 154(b) by 33 days.

(21) Appl. No.: 16/654,924

(22) Filed: Oct. 16, 2019

(65) Prior Publication Data
US 2020/0293487 A1    Sep. 17, 2020

Related U.S. Application Data (60) Provisional application No. 62/751,905, filed on Oct. 29, 2018.

(51) Int. Cl.
*G06F 15/80* (2006.01)
(52) U.S. Cl.
CPC .................. *G06F 15/8046* (2013.01)
(58) Field of Classification Search
CPC .......... G06F 9/30; G06F 9/32; G06F 15/8046; G06T 1/20
See application file for complete search history.

(56) References Cited

U.S. PATENT DOCUMENTS

| | | | |
|---|---|---|---|
| 4,972,361 A * | 11/1990 | Rader | ................. G06F 15/8046 708/441 |
| 6,226,680 B1 | 5/2001 | Boucher et al. | |
| 6,247,060 B1 | 6/2001 | Boucher et al. | |
| 6,480,937 B1 | 11/2002 | Vorbach et al. | |
| 6,571,381 B1 | 5/2003 | Vorbach et al. | |
| 6,687,788 B2 | 2/2004 | Vorbach et al. | |
| 6,990,555 B2 | 1/2006 | Vorbach et al. | |
| 7,003,660 B2 | 2/2006 | Vorbach et al. | |
| 7,069,372 B1 | 6/2006 | Leung, Jr. et al. | |
| 7,174,443 B1 | 2/2007 | Vorbach et al. | |
| 7,210,129 B2 | 4/2007 | May et al. | |
| 7,266,725 B2 | 9/2007 | Vorbach et al. | |
| 7,382,787 B1 | 6/2008 | Barnes et al. | |

(Continued)

FOREIGN PATENT DOCUMENTS

| | | |
|---|---|---|
| KR | 10-2005-0073506 | 7/2005 |
| WO | 2006/093079 | 9/2006 |

(Continued)

OTHER PUBLICATIONS

Shaaban, "Systolic Architectures", EECC756, Portland State University, Mar. 11, 2003.*

(Continued)

*Primary Examiner* — David J. Huisman
(74) *Attorney, Agent, or Firm* — Greenberg Traurig LLP (57) ABSTRACT

Systems and methods for protocol processing using a systolic array (e.g., programmed in an FPGA). For example, protocol processing is performed for incoming data (e.g., received for storage) prior to encryption and/or sending to a remote storage device (e.g., cloud storage or server).

18 Claims, 3 Drawing Sheets

(56) References Cited

U.S. PATENT DOCUMENTS

| | | | |
|---|---|---|---|
| 7,394,284 B2 | 7/2008 | Vorbach | |
| 7,418,536 B2 | 8/2008 | Leung et al. | |
| 7,434,191 B2 | 10/2008 | Vorbach et al. | |
| 7,444,531 B2 | 10/2008 | Vorbach et al. | |
| 7,450,438 B1 | 11/2008 | Holst et al. | |
| 7,480,825 B2 | 1/2009 | Vorbach | |
| 7,525,904 B1 | 4/2009 | Li et al. | |
| 7,577,822 B2 | 8/2009 | Vorbach | |
| 7,581,076 B2 | 8/2009 | Vorbach | |
| 7,595,659 B2 | 9/2009 | Vorbach et al. | |
| 7,602,214 B2 | 10/2009 | Vorbach | |
| 7,657,861 B2 | 2/2010 | Vorbach et al. | |
| 7,657,877 B2 | 2/2010 | Vorbach et al. | |
| 7,710,991 B1 | 5/2010 | Li et al. | |
| 7,782,087 B2 | 8/2010 | Vorbach | |
| 7,840,842 B2 | 11/2010 | Vorbach et al. | |
| 7,844,796 B2 | 11/2010 | Vorbach et al. | |
| 7,928,763 B2 | 4/2011 | Vorbach | |
| 7,996,827 B2 | 8/2011 | Vorbach et al. | |
| 8,058,899 B2 | 11/2011 | Vorbach et al. | |
| 8,069,373 B2 | 11/2011 | Vorbach | |
| 8,099,618 B2 | 1/2012 | Vorbach et al. | |
| 8,127,061 B2 | 2/2012 | Vorbach et al. | |
| 8,145,881 B2 | 3/2012 | Vorbach et al. | |
| 8,156,284 B2 | 4/2012 | Vorbach et al. | |
| 8,209,653 B2 | 6/2012 | Vorbach et al. | |
| 8,270,399 B2 | 9/2012 | Holst et al. | |
| 8,270,401 B1 | 9/2012 | Barnes et al. | |
| 8,281,265 B2 | 10/2012 | Vorbach et al. | |
| 8,301,872 B2 | 10/2012 | Vorbach et al. | |
| 8,312,301 B2 | 11/2012 | Vorbach et al. | |
| 8,335,915 B2 | 12/2012 | Plotkin et al. | |
| 8,423,780 B2 | 4/2013 | Plotkin et al. | |
| 8,429,385 B2 | 4/2013 | Vorbach | |
| 8,686,549 B2 | 4/2014 | Vorbach | |
| 8,791,190 B2 | 7/2014 | Paressley et al. | |
| 8,812,820 B2 | 8/2014 | Vorbach et al. | |
| 8,914,590 B2 | 12/2014 | Vorbach et al. | |
| 9,037,807 B2 | 5/2015 | Vorbach | |
| 9,094,237 B2 | 7/2015 | Barnes et al. | |
| 9,170,812 B2 | 10/2015 | Vorbach et al. | |
| 9,231,865 B2 * | 1/2016 | Sankaralingam | H04L 45/745 |
| 9,317,718 B1 | 4/2016 | Takahashi | |
| 9,374,344 B1 | 6/2016 | Takahashi | |
| 9,794,064 B2 | 10/2017 | Takahashi | |
| 2001/0021949 A1 | 9/2001 | Blightman et al. | |
| 2001/0023460 A1 | 9/2001 | Boucher et al. | |
| 2001/0027496 A1 | 10/2001 | Boucher et al. | |
| 2001/0036196 A1 | 11/2001 | Blightman et al. | |
| 2003/0046607 A1 | 3/2003 | May et al. | |
| 2003/0056202 A1 | 3/2003 | May et al. | |
| 2003/0074518 A1 | 4/2003 | Vorbach et al. | |
| 2004/0015899 A1 | 1/2004 | May et al. | |
| 2004/0025005 A1 | 2/2004 | Vorbach et al. | |
| 2004/0095998 A1 | 5/2004 | Luo et al. | |
| 2004/0128474 A1 | 7/2004 | Vorbach | |
| 2004/0153608 A1 | 8/2004 | Vorbach et al. | |
| 2004/0153642 A1 | 8/2004 | Plotkin et al. | |
| 2004/0158640 A1 | 8/2004 | Philbrick et al. | |
| 2004/0190512 A1 * | 9/2004 | Schultz | H04L 49/3009 370/389 |
| 2004/0243984 A1 | 12/2004 | Vorbach et al. | |
| 2004/0249880 A1 | 12/2004 | Vorbach | |
| 2005/0022062 A1 | 1/2005 | Vorbach | |
| 2005/0053056 A1 | 3/2005 | Vorbach et al. | |
| 2005/0066213 A1 | 3/2005 | Vorbach et al. | |
| 2005/0086462 A1 | 4/2005 | Vorbach | |
| 2005/0086649 A1 | 4/2005 | Vorbach et al. | |
| 2005/0223212 A1 | 10/2005 | Vorbach et al. | |
| 2005/0257009 A9 | 11/2005 | Vorbach et al. | |
| 2006/0013162 A1 | 1/2006 | Lim | |
| 2006/0075211 A1 | 4/2006 | Vorbach | |
| 2006/0117126 A1 | 6/2006 | Leung et al. | |
| 2006/0136735 A1 | 6/2006 | Plotkin et al. | |
| 2006/0165006 A1 | 7/2006 | Kelz | |
| 2006/0192586 A1 | 8/2006 | Vorbach | |
| 2006/0245225 A1 | 11/2006 | Vorbach | |
| 2006/0248317 A1 | 11/2006 | Vorbach et al. | |
| 2007/0011433 A1 | 1/2007 | Vorbach | |
| 2007/0050603 A1 | 3/2007 | Vorbach et al. | |
| 2007/0083730 A1 | 4/2007 | Vorbach et al. | |
| 2007/0113046 A1 | 5/2007 | Vorbach et al. | |
| 2007/0150637 A1 | 6/2007 | Vorbach | |
| 2007/0195951 A1 * | 8/2007 | Leung, Jr. | H04L 9/0618 380/37 |
| 2007/0299993 A1 | 12/2007 | Vorbach et al. | |
| 2008/0191737 A1 | 8/2008 | Vorbach | |
| 2009/0006895 A1 | 1/2009 | May et al. | |
| 2009/0031104 A1 | 1/2009 | Vorbach et al. | |
| 2009/0037587 A1 | 2/2009 | Yoshimi et al. | |
| 2009/0037865 A1 | 2/2009 | Vorbach et al. | |
| 2009/0063702 A1 | 3/2009 | Holst et al. | |
| 2009/0100286 A1 | 4/2009 | Vorbach et al. | |
| 2009/0144522 A1 | 6/2009 | Vorbach et al. | |
| 2009/0146691 A1 | 6/2009 | Vorbach et al. | |
| 2009/0150725 A1 | 6/2009 | Vorbach | |
| 2009/0172351 A1 | 7/2009 | Vorbach et al. | |
| 2009/0210653 A1 | 8/2009 | Vorbach et al. | |
| 2009/0300262 A1 | 12/2009 | Vorbach | |
| 2010/0023796 A1 | 1/2010 | Vorbach et al. | |
| 2010/0039139 A1 | 2/2010 | Vorbach | |
| 2010/0070671 A1 | 3/2010 | Vorbach et al. | |
| 2010/0095088 A1 | 4/2010 | Vorbach | |
| 2010/0095094 A1 | 4/2010 | Vorbach et al. | |
| 2010/0122064 A1 | 5/2010 | Vorbach | |
| 2010/0153654 A1 | 6/2010 | Vorbach et al. | |
| 2010/0174868 A1 | 7/2010 | Vorbach | |
| 2010/0238942 A1 * | 9/2010 | Estan | H04L 45/60 370/401 |
| 2010/0241823 A1 | 9/2010 | Vorbach et al. | |
| 2011/0006805 A1 | 1/2011 | Vorbach | |
| 2011/0060942 A1 | 3/2011 | Vorbach | |
| 2011/0161977 A1 | 6/2011 | Vorbach | |
| 2011/0238948 A1 | 9/2011 | Vorbach et al. | |
| 2012/0197856 A1 | 8/2012 | Banka et al. | |
| 2012/0277333 A1 | 11/2012 | Pressley et al. | |
| 2012/0320921 A1 | 12/2012 | Barnes et al. | |
| 2013/0283060 A1 | 10/2013 | Kulkarni et al. | |
| 2015/0095645 A1 | 4/2015 | Eldar | |
| 2015/0106596 A1 | 4/2015 | Vorbach et al. | |
| 2016/0055120 A1 | 2/2016 | Vorbach et al. | |
| 2017/0085372 A1 | 3/2017 | Anderson et al. | |
| 2017/0230447 A1 | 8/2017 | Harsha et al. | |
| 2017/0359317 A1 | 12/2017 | Anderson et al. | |
| 2019/0158427 A1 | 5/2019 | Harsha et al. | |
| 2020/0004695 A1 | 1/2020 | Anderson et al. | |
| 2020/0177540 A1 | 6/2020 | Abel | |
| 2020/0192701 A1 | 6/2020 | Horowitz et al. | |

FOREIGN PATENT DOCUMENTS

| | | |
|---|---|---|
| WO | 2020/023364 | 1/2020 |
| WO | 2020/092009 | 5/2020 |

OTHER PUBLICATIONS

The International Bureau of WIPO; PCT International Preliminary Report of Patentability, issued in connection to PCT/US2019/056644; 7 pages; dated Apr. 27, 2021; Switzerland.

Korean Intellectual Property Office; PCT International Search Report, issued in connection to PCT/US2019/042793; dated Nov. 11, 2019; 3 pages; Korea.

Korean Intellectual Property Office; PCT Written Opinion of the International Searching Authority, issued in connection to PCT/US2019/042793; dated Nov. 11, 2019; 6 pages; Korea.

Korean Intellectual Property Office; PCT International Search Report, issued in connection to PCT/US2019/056644; dated Feb. 5, 2020; 9 pages; Korea.

Korean Intellectual Property Office; PCT Written Opinion of the International Searching Authority, issued in connection to PCT/US2019/056644; dated Feb. 5, 2020; 6 pages; Korea.

(56) References Cited

OTHER PUBLICATIONS

The International Bureau of WIPO; PCT International Preliminary Report on Patentability, issued in connection to PCT/US2019/042793; dated Jan. 26, 2021; 7 pages; Switzerland.

* cited by examiner

DATA STREAM PROTOCOL FIELD DECODING BY A SYSTOLIC ARRAY

RELATED APPLICATIONS

This application claims priority to U.S. Provisional Application Ser. No. 62/751,905 filed Oct. 29, 2018, entitled "SYSTOLIC PROTOCOL PROCESSOR," by JORDAN ANDERSON et al., the entire contents of which application is incorporated by reference as if fully set forth herein.

FIELD OF THE TECHNOLOGY

At least some embodiments disclosed herein relate to protocol processing for incoming data using one or more systolic arrays in general (e.g., for processing the incoming data prior to sending to secure data storage).

BACKGROUND

An encryption appliance can be inserted in-line into an existing network and used to encrypt full duplex data at, for example, multigigabit line speeds. This can reduce performance penalties imposed by, for example, encryption software running on a general-purpose server, and can allow encryption of data in flight to storage at local or remote locations.

Data can be stored remotely using various protocols. One example of a storage protocol is an Internet Small Computer Systems Interface (iSCSI), which is an Internet Protocol (IP)-based storage networking standard for linking data storage facilities. For example, iSCSI can be used to transmit data over local area networks (LANs), wide area networks (WANs), or the Internet and can enable location-independent data storage and retrieval. The iSCSI protocol can allow client devices to send, for example, SCSI commands to storage devices on remote servers. In one example, iSCSI is used as a storage area network protocol, allowing consolidation of storage into storage arrays for clients (e.g., database and web servers).

In some cases, data to be stored remotely requires Transmission Control Protocol (TCP) processing prior to being stored. The Transmission Control Protocol provides, for example, a communication service between an application and the Internet Protocol (e.g., host-to-host connectivity at the transport layer of the Internet model). An application does not need to know the particular mechanisms for sending data via a link to another host. At the transport layer, TCP handles handshaking and transmission details and presents an abstraction of the network connection to the application (e.g., through a network socket interface).

At lower levels of the protocol stack, due to network congestion, traffic load balancing, or other unpredictable network behavior, IP packets may be lost, duplicated, or delivered out of order. TCP detects these problems, requests re-transmission of lost data, and rearranges out-of-order data. If the data still remains undelivered, the source is notified of this failure. Once a TCP receiver has reassembled a sequence of data originally transmitted, it passes the data to the receiving application.

TCP is, for example, used by many applications available by internet, including the World Wide Web (WWW), e-mail, File Transfer Protocol, Secure Shell, peer-to-peer file sharing, and streaming media applications. TCP is, for example, designed for accurate delivery rather than timely delivery and can incur relatively long delays while waiting for out-of-order messages or re-transmissions of lost messages. TCP is, for example, a stream delivery service which guarantees that all bytes received will be identical to bytes sent and will be in the correct order.

In some cases, hardware implementations known as TCP offload engines (TOEs) are used to handle TCP processing. One problem of TOEs is that they are difficult to integrate into computing systems, sometimes requiring extensive changes in the operating system of the computer or device.

SUMMARY OF THE DESCRIPTION

Systems and methods for protocol processing for incoming data (e.g., packets in an incoming data stream) are described herein. Some embodiments are summarized in this section.

The present embodiments include the realization that data in transit is wrapped in layers of additional protocol information. For instance, Ethernet, Fibre Channel, Network File System (NFS), SATAm and iSCSI all have a protocol layer around the data payload. This additional information needs to be stripped off and processed for a receiving system (e.g., an encryption appliance) to understand how to handle the underlying data stream.

Typically, there are many types of protocols to parse and they must be parsed quickly on an incoming data stream. Traditionally, protocol parsing has been done as a serial process on a central processing unit (CPU). The traditional approach is not fast enough for systems requiring modern network line speed data processing.

In contrast to the above, the protocol processing according to various embodiments described herein provides a technical solution to the technical problems caused by prior approaches as described above. In various embodiments, a packet input engine is configured as a protocol parser in a systolic array. The systolic array is, for example, a two-dimensional array of processing units that can take in data, fan out the data to multiple parallel processing units, and move the data through a pipeline of parallel processing units on every clock tick. This pipelined architecture enables processing multiple packets simultaneously, providing much higher throughput.

Each protocol has different characteristics, so the protocol parser is designed for a target protocol. In various embodiments, a systolic protocol parser is built with an array of protocol field decoders and interconnects to other decoders. These decoders identify where in the data stream there is data that needs to be processed, and further what type of processing needs to be done for the target protocol.

In one embodiment, systolic array components including protocol parsing can be compiled into a field programmable gate array (FPGA). In this embodiment, the systolic array parsing fans out decision making during protocol parsing enabling faster decisions based on the information parsed out of the data stream. This embodiment also allows generating the required FPGA logic based on the targeted protocol.

In various embodiments, the protocol processing that is performed is based on one or more protocol fields corresponding to portions of data in an incoming data stream. A protocol field can include, for example, a command (e.g., an op-code), an offset, or a byte count. In some cases, a protocol field includes, for example, an identification of a specific protocol. The protocol processing is performed in one or more systolic arrays. The systolic arrays can be implemented, for example, in one or more field-programmable gate arrays (FPGAs). The path of processing through the systolic array for each data portion is dependent on the one or more protocol fields. In various embodiments, different data portions are processed in a parallel processing pipeline. Timing for the pipeline is provided by a system clock, and each data portion advances from one stage to another in the pipeline on each tick of the system clock.

In one embodiment, a method includes: receiving a data stream comprising data portions; parsing, in a systolic array, at least one protocol field for each respective data portion; and based on the parsed at least one protocol field for each respective data portion, performing at least one of encrypting the data portion, decrypting the data portion, or guarding the data portion.

In one embodiment, a method includes: receiving a data stream; separating the data stream into a plurality of data portions; providing the data portions as one or more inputs to a plurality of processing units in at least one systolic array; providing at least one output from the at least one systolic array; and identifying, based on the at least one output, at least one portion of the data stream for processing.

In one embodiment, a system includes: a packet engine including at least one first field-programmable gate array (FPGA), the packet engine configured to receive incoming packets, and the packet engine comprising at least one systolic array configured to parse a protocol field for each incoming packet, and further configured to process, route, or switch each packet for at least one of encryption or authentication processing based on a result from parsing the protocol field for the respective packet; and a cryptographic engine including at least one second FPGA, the cryptographic engine configured to receive each packet from the packet engine, and the cryptographic engine comprising at least one systolic array configured to perform at least one of encryption or authentication processing for the packet.

In one embodiment, a system includes: at least one processor or FPGA; and memory storing instructions configured to instruct or program the at least one processor or FPGA to: receive, from a local device, a data stream comprising data portions; parse, using a systolic array, at least one protocol field for each respective data portion; encrypt, based on the respective parsed at least one protocol field, each data portion to provide encrypted data; and send the encrypted data to a remote storage device.

In some cases, data coming from a network to a device (such as data to be stored in a remote storage device) may require protocol processing prior to cryptographic processing (e.g., encryption). In one embodiment, protocol processing is performed to keep up with high-speed network data rates such as 100 Gigabit per second networks. Various embodiments herein may perform protocol processing to network line speed rates by using one or more systolic arrays (e.g., programmed into one or more field-programmable gate arrays (FPGAs)). In one embodiment, the protocol processing is performed by a processor configured to include a systolic array of processing units. For example, the processor may be included in an encryption appliance.

In some embodiments, a systolic array uses multiple in-line single-function processing units to process incoming data in a pipelined manner. Data passing through each processing unit can be spread out to dedicated hardware resources with each processing unit having all the resources needed to process and move data to the next pipeline step on each clock tick. For example, a protocol processor processes incoming data packets to identify a protocol associated with each packet. In one example, after protocol processing, the data is assembled into the correct blocks required by the underlying data type (e.g. Network File System (NFS) or Amazon Web Services (AWS)). In one example, when data is finished protocol processing, it is sent on to a next systolic processing unit such as an encryption engine.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DESCRIPTION

The following description and drawings are illustrative and are not to be construed as limiting. Numerous specific details are described to provide a thorough understanding. However, in certain instances, well known or conventional details are not described in order to avoid obscuring the description. References to "one embodiment" or "an embodiment" in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Data encryptors (e.g., an encryption appliance) can perform in-line encryption for data storage protocols between clients and remote storage devices. The present embodiments include the realization that, in a typical software solution implemented with general purpose CPUs, an input data stream is handled serially byte-by-byte. For example, a CPU may take one word at a time and take several clocks to perform processing of the word. This serial processing is slower than what is needed for modern high-speed networks.

In many cases, data in transit is wrapped in layers of additional information that identify how the data is communicated while in transit, which blocks of data belong together, the format of data to be stored, etc. This additional information needs to be stripped off and processed for a receiving system (e.g., an encryption appliance) to understand how to handle the underlying data stream. Data-at-rest protocols communicate using a series of protocol fields (e.g., commands such as op-codes and/or other fields that provide information).

The protocol fields differentiate types of information such as data, meta-data, and overhead, and/or define how bits in an input data stream should be interpreted. For example, commands can be either fixed or variable length. An incoming data stream is parsed to identify each command, determine the command length, identify where in the stream the data begins and ends, and find where the next command starts. For example, a protocol field may identify the packet is of type NFS and all data between two byte offsets needs to be encrypted. One significant problem is that there are many types of protocols to parse and the incoming data stream needs to be parsed quickly so the data can be extracted or separated out for further processing (e.g., encryption, etc.).

Many protocols, such as Network File System (NFS), were designed to be processed by central processing units (CPU) which process data in a serial manner. To process a data stream faster, a CPU must run at a higher clock rate. CPU clock rates generally stopped improving years ago. Thus, a new parallelizable approach is needed to be able to run protocol parsing in real-time and at modern network line speeds.

Various embodiments described herein provide a technical solution to the above technical problems. When using a systolic array according to these various embodiments, several processing units look at several bytes in the input data stream at a time (e.g., on each clock tick). The systolic array as described herein provides a technical solution to the technical problems caused by prior approaches as described above. Various embodiments herein use a high throughput systolic protocol processor to decompose the network data stream to discover which data portions need to be encrypted or decrypted.

In various embodiments, each processing unit of the systolic array is programmed to generate the correct results for the next column of the systolic array, and the results are propagated across time so that multiple bytes from the input data stream can be processed simultaneously. The systolic array fans out the data from the input data stream across multiple rows, and on each clock cycle the row outputs generate inputs for the next column in the systolic array. The first column is then free to take a new set of words (e.g., from the input data stream) on the next clock while the next row is processing the previous set of words.

In one embodiment, the systolic array protocol parser has a pipelined architecture such that multiple packets can be processed simultaneously, providing much higher throughput. This enables high-speed "bump in the wire" data processing for systems requiring high speed such as a data-at-rest encryptor.

The protocol parsing provides the ability to generate the FPGA logic needed based on the protocol targeted in a way so that decision making is fanned out during protocol parsing. In one embodiment, the FPGA logic is generated by enumerating all expected combinations of sets of protocol fields for protocols supported by an encryption appliance. This logic is then broken into appropriately sized systolic array processing units and interconnected according to the enumeration. In operation, the FPGA logic compares the incoming data against the enumeration of all expected sets of protocol fields (e.g., all possible sets for data expected in the incoming data stream). If a set of protocol fields matches a particular set of protocol fields, then a protocol specific operation is performed, and the result is sent to the next processing unit in the systolic array.

In one embodiment, a packet input engine is configured as a protocol parser in a systolic array. A systolic array is, for example, a two-dimensional array of processing units that can take in data, fan out the data to multiple parallel processing units, and push the data through a pipeline of parallel processing units on every clock tick. This creates a two-dimensional pipeline assembled in rows and columns that spreads processing out over space and time with each stage doing a different piece of the processing for a continuous stream of incoming data. This systolic array approach allows for a pipelined architecture such that multiple packets can be processed simultaneously, providing much higher throughput. This enables high-speed "bump in the wire" data processing for systems such as a high-speed data-at-rest encryptor. It also allows for much faster implementation of new protocols.

Computer systems use various protocols operating at different levels within a software stack to transmit and store data. For example, at the link layer the Ethernet Media Access Control (MAC) protocol may be used. The Internet Protocol (IP) layer may use Internet Protocol version 4 (IPv4) or Internet Protocol Version 6 (IPv6). The Transport layer may use Transport Control Protocol (TCP). The storage protocol may be implemented using Network File System (NFS) or a cloud storage protocol like Amazon Web Service (AWS) S3. These are all standard protocols defined for computing systems. A systolic protocol parser can be designed to understand and parse various different protocols, such as the foregoing and/or others.

In one embodiment, a systolic array protocol parser includes one or more protocol decoding units programmed to understand protocols. The protocol decoding unit is used to decode the protocol on an incoming stream, for example an AWS S3 or NFS storage protocol. The protocol itself will determine which systolic array processing units are implemented as instances in the array, and further how these units are connected.

In one exemplary implementation for secure data storage, a user system writes out data blocks to a remote storage device, and an encryption appliance performs protocol processing as described herein on the incoming data blocks, and then stores the data associated with the writing of the data blocks (e.g., an identifier can be stored for each data block). When the data blocks are later retrieved from the remote storage device, the encryption appliance can access the stored data (e.g., access the stored data block identifiers). In one example, the encryption appliance can use protocol processing by parsing protocol fields as described in the various embodiments below.

Figure 1:
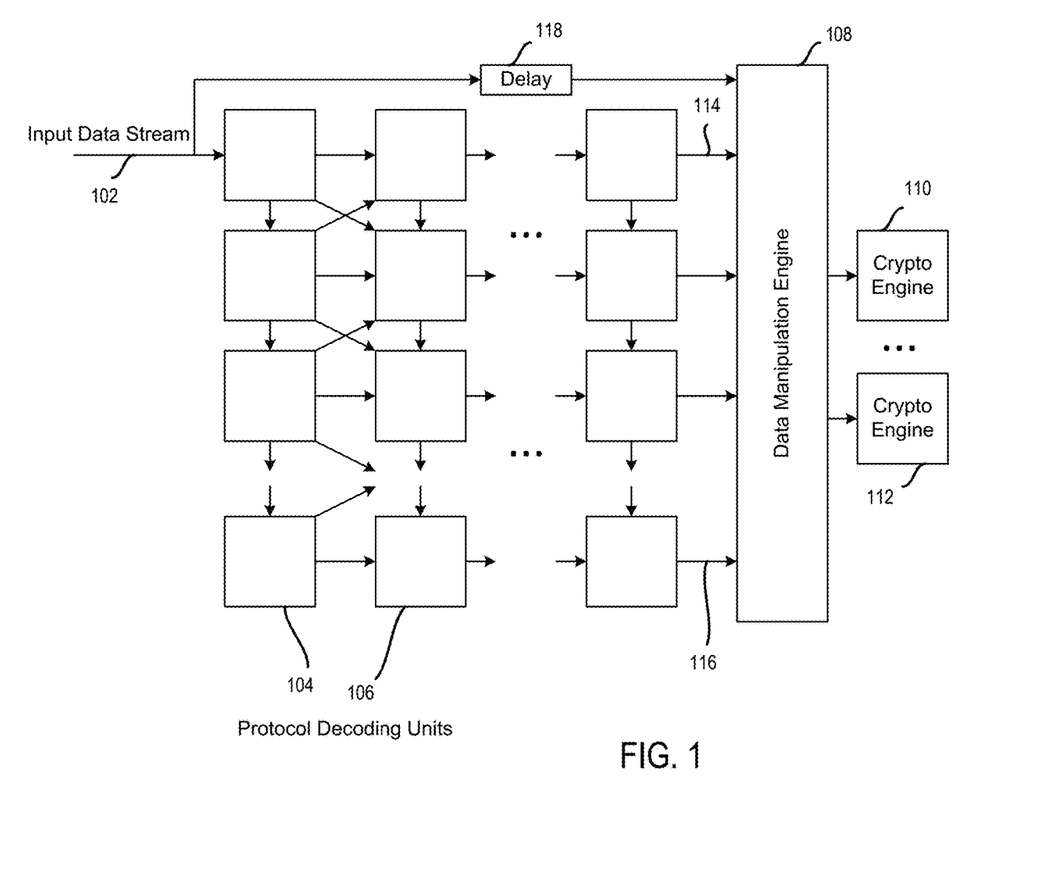
FIG. 1 shows a systolic array for parsing protocol fields in an input data stream, according to one embodiment.

FIG. 1 shows a systolic array for parsing protocol fields in an input data stream 102, according to one embodiment. The input data stream 102 is separated into data portions that are provided to processing units of the systolic array. For example, some of these processing units include protocol decoding units 104 and 106. Another example of a processing unit of the systolic array is processing unit 118, which is used to provide a delay to propagation of certain data through the systolic array so that an output from the array arrives at data manipulation engine 108 in a synchronous way (e.g., at the same time or on the same clock tick).

In one embodiment, each data portion (e.g., a data block) from the input data stream 102 is provided as an input to a processing unit in the systolic array. Several of the processing units (e.g., protocol decoding units 104 or 106) are used to perform decoding of one or more protocol fields in the data portion. In one embodiment, protocol fields are parsed and decoded one at a time as data moves through the systolic array (e.g., a first protocol field for a first data wrapper is parsed, which determines routing of the data through the systolic array to a next processing unit, which parses a second protocol field exposed by removing the first data wrapper).

After each data portion undergoes protocol processing from propagating through the systolic array, one or more outputs 114, 116 are provided from the systolic array. In one embodiment, the outputs 114 and/or 116 are used to indicate one or more portions of the data stream for further processing. For example, the outputs 114 or 116 can indicate starting and ending bytes of data to be encrypted.

In one embodiment, the outputs from the systolic array are provided to data manipulation engine 108. Data manipulation 108 can perform further processing of data from the input data stream 102 (e.g., prior to encryption). After any further processing, data is provided from data manipulation engine 108 to one of the cryptographic engines 110-112.

In one embodiment, the systolic array is configured as a systolic protocol parser that separates out the data portion of the input data stream 102 from the protocol headers. In one example, this is performed by a systolic protocol parser that uses an array of protocol field partial decoders (e.g., protocol decoding units 104, 106) and interconnects to other similar decoders. These partial protocol field decoders can be created from an enumeration of all possible sets of supported protocol fields and an identification where in the data stream there is data that needs to be further processed, for example encrypted/decrypted, and what type of processing needs to be done for that protocol.

When input data comes in, the input data is broken into several different parts (e.g., first byte, second byte, third byte, etc.) and fanned across multiple decoding units. For example, the output from one processing unit can move to at least two other processing units based on results from the first processing unit (e.g., a result from decoding a first protocol field, or from matching a combination of protocol fields for incoming data to one of many possible sets of protocol fields). Each decoder processes as much information as it can within a clock tick (e.g., of a system clock of the array) and then passes the partial results on to the next stages of the systolic array. The initial column does processing in one clock, then the second column processes in one clock and sends the output to the next column, etc. Each column is like a parallel pipeline. Each column performs the extent of processing as the underlying FPGA technology allows in one clock tick. For example, some processes may take more than one clock, but most processing for each stage is typically done in one clock. The total amount of work that needs to be done is fixed by the protocol that is being implemented. The work is spread across the number of columns required by the protocol. Slower FPGA technologies will require more columns or more clocks per column. A significant advantage of the present embodiments is provided by systolic array processing with splitting of the input into parallel processing streams.

In one embodiment, all data for an incoming stream (e.g., input data stream 102) comes in one end of the systolic array and results in a decision (e.g., output 114 or 116). However, there are many paths through the logic of the systolic array. Pipeline pieces may feed different follow-on units. The route an incoming data stream takes is determined by the algorithm and logic results for that data stream. For example, a processing unit in the array may detect a current state or the presence of some text string, which may drive the data to one or more follow-on array processing units for further protocol parsing or data processing. A systolic array may also include processing units (e.g., delay unit 118) that are primarily for, or do nothing other than, delay the input data stream 102 so that it arrives at a data manipulation engine 108 (e.g., a TCP processing unit) at the same time as the protocol decode results.

In one embodiment, when an input data stream is received by the array, the parser is configured with the first protocol field, and all the other possible protocols that may show up after the first field. For example, an Ethernet connection always starts with an Ethernet header that contains an Ethernet type field. The Ethernet type field indicates what type of data is next, for instance IPv4 or ARP. So, once the Ethernet type field is understood, the data can be sent to an appropriate downstream processing unit in the systolic array.

In another example, when processing an NFS stream, some data packets may have commands to create a file, set a timestamp, or return information that is stored in a directory. The protocol parser simply passes those commands on through since they do not contain any file content. If the protocol parser detects an operation command to write a file, for example, that is a flag that the data will need further processing (e.g., to start encrypting at a specified byte in the data stream, end encrypting at a specified byte, and encrypt everything in between the start and end points).

In one embodiment, to set the flags that indicate where to start and end processing (e.g., encryption when writing a file for secure storage), the protocol parser monitors the stream as it is moving through the array. The stream is parsed and key information identified that is needed to decide how to process the stream (e.g., processing by cryptographic engine 110 or 112). Each protocol has different characteristics, so the protocol parser needs to be protocol aware in order to make fast decisions based on the information parsed out of the stream. Protocol decoding units may also request insertion of other protocol fields such as protocol fields for later retrieving data from a data storage unit (e.g., remote storage in a cloud).

In one embodiment, when needed, each protocol decoding unit can alternatively and/or additionally check the integrity of the protocol fields and associated protocol field arguments parsed out of the input data stream 102 to see if the protocol fields and/or field arguments meet certain requirements (e.g., a predetermined rule set). For example, a decoder (e.g., protocol decoding unit 104 or 106) may only allow access through a specific TCP port. This checking against requirements is sometimes referred to herein as "guarding". Guarding protects unexpected traffic from passing thru the device (e.g., an encryption appliance). In one example, unexpected traffic is discarded and/or reported (e.g., reported to a local user device that has requested that data blocks be written to storage).

In one embodiment, the systolic array components are compiled into a field-programmable gate array (FPGA). In other embodiments, the array can be implemented in other ways such as by using an Application Specific Integrated Circuit (ASIC), or by splitting processing across multiple FPGAs. Protocols are complex and typically require a significant number of FPGA gates to implement. Therefore, each FPGA sometimes may decode only a single protocol at a time. FPGAs can also be reprogrammed to support different protocols at different times. For example, the FPGA can be programmed to support one or more protocols and later reprogrammed with a different protocol or protocols.

If there are enough logic elements in an FPGA, it may be possible to support multiple protocols in one FPGA. In this case, all enumerations of possible combinations of sets of protocol fields are combined to determine the processing that is needed for incoming data. Then, protocol specific actions are contained in separate systolic processing units.

For example, a data encryptor may have Ethernet, TCP, and IP layers parsed in a combined set of systolic processing units. The result is then sent to a TCP processing unit that reassembles multiple packets into an NFS stream. The NFS stream is then parsed, and the result is sent to, for example, encryption engines. In this example, the systolic processing units doing the initial parsing are based upon the enumeration of all possible sets of Ethernet, TCP and IP protocol headers before the result is sent to systolic processing units dedicated to specific protocols.

In one embodiment, a packet engine includes an FPGA that is programmed to implement processing units (e.g., protocol decoding units 104, 106) in a systolic array. Based on results from parsing one or more protocol fields of data (e.g., a combination of protocol fields for an incoming packet), the data is routed to a cryptographic engine (e.g., cryptographic engine 110) for encryption processing. The cryptographic engine includes, for example, an FPGA programmed to implement a systolic array for encryption of the data from the packet engine.

In alternative embodiments, a two-dimensional systolic array can be implemented in other ways such as with an array of general purpose CPUs. However, other implementations would likely require more hardware and more power and also be slower. General purpose CPUs must fetch instructions to identify what to do next. By contrast, each processing unit in an FPGA implementation of a systolic array is built to do one task quickly. If an input is entered into a systolic array processing unit on one clock cycle there will quickly be an output, usually within one clock cycle. Hence, an improved pipelined circuit is generated for that protocol.

Figure 2:
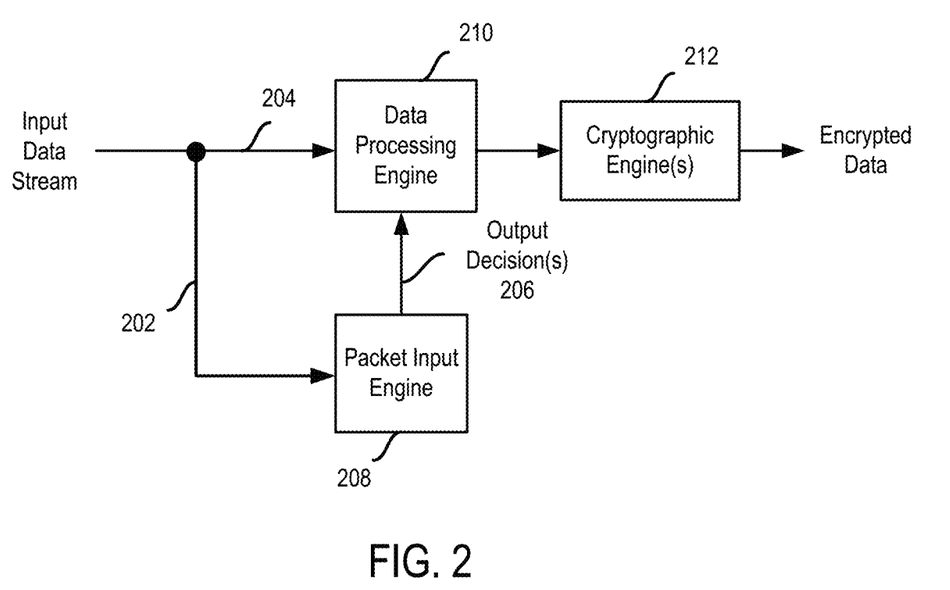
FIG. 2 shows a system for processing an input data stream using an packet input engine, according to one embodiment.

FIG. 2 shows a system for processing an input data stream (e.g., input data stream 102) using a packet input engine 208 (e.g., an FPGA including the systolic array illustrated in FIG. 1), according to one embodiment. A portion 202 of the input data stream is provided as an input to packet input engine 208. One or more output decisions 206 are provided from packet input engine 208 based on protocol processing of the portion 202. In one embodiment, the protocol processing is based on combinations of protocol fields associated with data in the portion 202. For example, the protocol processing can include processing similarly as described with reference to FIG. 1 above.

Data 204 from the input data stream is provided to the data processing engine 210. In one embodiment, all of the input data stream is provided as data 204. In another embodiment, a portion of the input data stream is provided as data 204.

In one embodiment, data processing by data processing engine 210 is controlled based on output decision(s) 206. In one example, data processing engine 210 includes data manipulation engine 108.

Processed data from data processing engine 210 is provided to one of cryptographic engines 212. In some embodiments, a single cryptographic engine 212 can be used. Cryptographic engines 212 can be implemented, for example, using one or more FPGAs. The selected cryptographic engine 212 performs cryptographic processing on identified data from the input data stream (e.g., encryption to provide encrypted data). In one embodiment, the identified data is encrypted based on starting and ending points provided as part of the output decision(s) 206.

In some embodiments, one or more systolic arrays can be used that have a wide variety of processing units such as protocol processing, network protocol, protocol delineation, data encryption, etc. For example, the systolic array can integrate functions as used in packet input engine 208, data processing engine 210, and/or cryptographic engines 212. Each processing unit is, for example, a small, single function processor. As data comes in, it is processed by the first processing unit, and is forwarded to the next processing unit, then on to the next processing unit, etc., until all processing is complete. Each processing unit is part of a data processing pipeline. Within each processing unit, data is also pipelined so that each processing unit can take in new data on each clock tick. In one embodiment, each processing unit performs just one function and has the specific resources needed to be able to process data on each clock tick.

In one embodiment, incoming data packets may be processed by a TCP packet processor, move on to a protocol processor (e.g., packet input engine 208), then move on to an encryption processor (e.g., cryptographic engine 212), etc., before being sent to storage.

In one embodiment, the TCP packet processor converts incoming packets to a byte stream for further processing by another engine or other layer. For example, incoming TCP packets can be processed by identifying the connection with which the packet is associated, stripping out the TCP headers, and assembling data into the correct blocks required by the underlying data type (e.g. Network File System or Amazon Web Services).

In one embodiment, each protocol processor is composed of several processing units. Each processing unit is an independent processor. When a packet first comes into the protocol processor (e.g., packet input engine 208), the header of the packet is searched to determine if the packet should be handled by the TCP packet processor, it is determined whether the packet uses a supported network protocol, and an identification is made for where the packet should be routed next.

In one embodiment, a next step in a TCP receive pipeline is a protocol processor (e.g., packet input engine 208). The protocol processor separates data into blocks based on the protocol for which a device has been built (e.g. Network File System (NFS), Internet Small Computer Systems Interface (iSCSI), Amazon Web Services (AWS), Hypertext Transfer Protocol (HTTP), Transport Layer Security (TLS), etc.) Each protocol processor is compiled for a specific protocol. For example, one TCP engine can support many protocol delineator engines. For each protocol, the data block size is either known or may be identified from data in the input data stream. The protocol processor is used to find the boundaries of each data block. In the TCP byte stream, the protocol processor will find the beginning of the data block, separate out one block of data and send that block of data to the next section. For example, with an NFS block, the protocol delineator would need to find a first command (e.g., an op-code), and then determine the next 500 bytes or whatever block size is correct for that particular NFS block.

In one embodiment, after protocol processing, a received packet is sent to the next systolic processing engine. There are several processors in the path before data is sent to storage. The next processing block can be the encryption engine. The encryption engine identifies what data needs to be encrypted and does the encryption.

In one embodiment, an Ethernet/IP/TCP packet encapsulator takes a packet of data and adds Ethernet headers such as source and destination MAC addresses, type fields, etc., so that the packet can be recognized by standard network devices. The packet is then sent out onto the network (e.g., remote network 306 of FIG. 3).

In one embodiment, the process for creating and implementing a systolic array starts with creating an algorithm, identifying what array units are needed, and the data processing flow and interconnects needed between processing units. Then, a tool is used to compile the required systolic array processing units and interconnects, and then program the systolic array solution into an FPGA. Each engine in the systolic array is built from FPGA gates using digital logic (e.g., AND gates, OR gates, flip-flops, etc.). Each engine has all the dedicated resources needed to perform its dedicated function.

Figure 3:
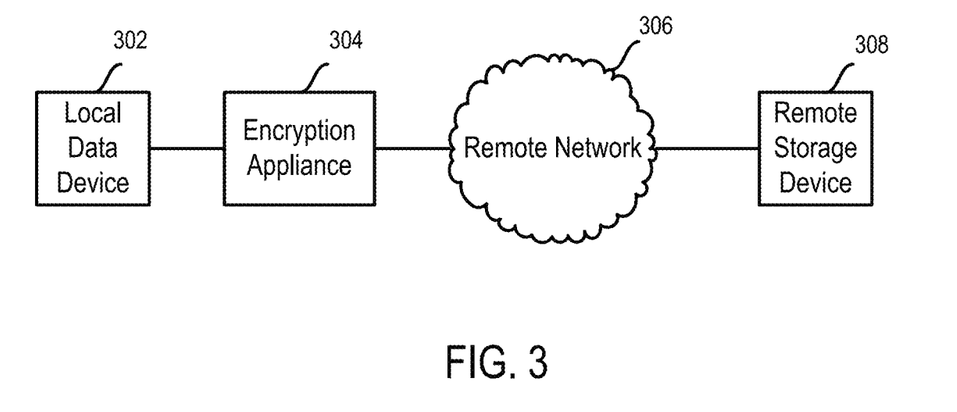
FIG. 3 shows a system for storing data blocks in a remote storage device, according to one embodiment.

FIG. 3 shows a system for storing data (e.g., data blocks) in a remote storage device 308, according to one embodiment. The data blocks to be stored are sent by a local data device 302 to an encryption appliance 304. The encryption appliance 304 can be, for example, a network appliance that uses protocol processing as described with reference to FIG. 1 (e.g., protocol processing using systolic array processing units as discussed above). The data blocks to be stored are sent over a remote network 306 (e.g., Internet, wide area network, local network, etc.) to the remote storage device 308. In one embodiment, the protocol processing is first performed, and then followed by encryption processing when the local data device 302 is writing data blocks to remote storage device 308.

In one embodiment, encryption appliance 304 receives the data stream from local data device 302. The data stream includes data portions (e.g., data blocks). One or more protocol fields for each data portion are parsed using a systolic array (e.g., the systolic array of FIG. 1). Based on information in the one or more protocol fields, each data portion is encrypted. Then, the encrypted data portions are sent to remote storage device 308.

In one example, encryption appliance 304 is used to write each data block to the remote storage device 308. A data block is retrieved that was previously written to the remote storage device 308. The encryption appliance 304 can be, for example, a hardware device that observes all data blocks being written out from a local data device's file system to a remote storage device, or read back into the local data device from a remote storage device. An example of this is an encryption device that is encrypting and decrypting data blocks to or from a remote storage provider such as Amazon Web Services (AWS) and transmitting the data through an Internet Small Computer Systems Interface (iSCSI).

In one embodiment, data blocks are stored using an iSCSI-based system or a system using another block storage protocol. The data blocks can also be stored on storage systems with self-encrypting drives. In one embodiment, TCP processing of incoming data is used to assemble the incoming data into data blocks corresponding to the storage protocol.

Variations

Without limiting the generality of the foregoing embodiments, various additional non-limiting embodiments and examples are now discussed below. In one embodiment, protocol processing as described above (e.g., protocol field decoding as illustrated in FIG. 1) can be used with or integrated into systolic processing that is implemented using an encryption appliance as described in U.S. Patent Application No. 62/678,595, filed May 31, 2018, entitled "LOCALLY-STORED REMOTE BLOCK DATA INTEGRITY," by Jordan Anderson, the entire contents of which application is incorporated by reference as if fully set forth herein. For example, the next stage of processing to which data can be routed during protocol processing can include encryption or decryption stages in a systolic array of an encryption appliance or gateway.

In some embodiments, the network appliance or encryption appliance (e.g., encryption appliance 304) can be implemented by or use encryption/decryption and/or communication methods and systems as described in U.S. patent application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, and/or as described in U.S. patent application Ser. No. 14/219,651, filed Mar. 19, 2014, entitled "SECURE END-TO-END COMMUNICATION SYSTEM," by Richard J. Takahashi, and/or as described in U.S. patent application Ser. No. 15/688,743, filed Aug. 28, 2017, entitled "CLOUD STORAGE USING ENCRYPTION GATEWAY WITH CERTIFICATE AUTHORITY IDENTIFICATION," by Jordan Anderson et al., the entire contents of which applications are incorporated by reference as if fully set forth herein. For example, the encryption appliance (e.g., encryption appliance 304 of FIG. 3) can use systolic matrix packet engines and multiplexers to process and route packets or other data, as described in the foregoing applications. In another example, the encryption appliance can be implemented using the encryption appliance as described in one or more of the foregoing applications. In another example, the encryption appliance or gateway is used to determine data integrity for data blocks stored in a remote storage device (e.g., a cloud storage server).

In one embodiment, data to be stored in remote storage is encrypted by the encryption appliance at a file or file object level, and at least one key is associated to a file object. Examples of an executable file include a complete program that can be run directly by an operating system (e.g., in conjunction with shared libraries and system calls). The file generally contains a table of contents, a number of code blocks and data blocks, ancillary data such as the memory addresses at which different blocks should be loaded, which shared libraries are needed, the entry point address, and sometimes a symbol table for debugging. An operating system can run an executable file by loading blocks of code and data into memory at the indicated addresses and jumping to it.

Examples of a file object include code that is logically divided into multiple source files. Each source file is compiled independently into a corresponding object file of partially-formed machine code known as object code. At a later time these object files are linked together to form an executable file. Object files have several features in common with executable files (table of contents, blocks of machine instructions and data, and debugging information). However, the code is not ready to run. For example, it has incomplete references to subroutines outside itself, and as such, many of the machine instructions have only placeholder addresses.

In one embodiment, the encryption appliance sets up a transport session with the remote cloud storage or server prior to receiving a payload from the client (e.g., from an application executing on the client), and the encryption appliance uses the transport session for sending or writing data from a plurality of client applications, including the client application, to the remote cloud storage or server.

In one embodiment, data received from a client for writing to remote storage includes a payload having a plurality of file objects, and a payload key is associated to each of the file objects. The payload key can be derived using metadata or file header information, as was described above. In either case, the metadata or file header contains information that is used to derive the payload cipher key with a KEK. The metadata or file header is maintained with the file/object for the life of the file/object so that it can be used at any time to derive the payload cipher key to decrypt the file/object (e.g., when it is read from remote cloud storage).

In one embodiment, the data received from the client comprises packets including a first packet, and a header is inserted into one or more of the packets (e.g., the first packet), wherein the header associates each packet to the client. The file object may be split among multiple packets. In the first packet of a file, identifying information is stored that is used to extract the correct key for decryption when the file is later read (this provides key association with the data).

In one embodiment, the payload key is associated to the client or an object in the data received from the client. The payload key association is made through an identifying feature of the cloud server protocol associated with the cloud or remote server. In Amazon Web Services (AWS), for example, a specific "bucket" (e.g., a folder) can have a key associated with it. The key to use is identified based on that information and uses that association.

Various additional embodiments (embodiment numbers 1-49) are described below. Each embodiment is numbered merely for the sake of reference and convenience.

1. A method comprising:
   receiving a data stream;
   separating the data stream into a plurality of data portions;
   providing the data portions as one or more inputs to a plurality of processing units in at least one systolic array;
   providing at least one output from the at least one systolic array; and
   identifying, based on the at least one output, at least one portion of the data stream for processing.

2. The method of embodiment 1, wherein the at least one systolic array comprises a plurality of protocol field decoders, wherein each decoder is connected to at least two other decoders, and wherein a processing result from each decoder determines a route that data being processed moves through the at least one systolic array.

3. The method of embodiment 2, wherein the protocol field decoders are used to identify a first portion of the data stream for processing, and to select a type of processing for the first portion, and wherein the type of processing corresponds to one of a plurality of protocols supported by one or more cryptographic engines coupled to encrypt identified portions of data in the data stream.

4. The method of embodiment 1, wherein the at least one systolic array comprises a two-dimensional array of processing units that receives the data portions, fans out the data portions to a pipeline of parallel processing units in the two-dimensional array, and moves the data portions through the pipeline of parallel processing units.

5. The method of embodiment 4, wherein the data portions move through the pipeline by advancing from one processing unit to another processing unit on each of a plurality of clock ticks.

6. The method of embodiment 1, further comprising comparing, by the at least one systolic array, a first set of protocol fields in the data stream to a plurality of sets of protocol fields.

7. The method of embodiment 6, wherein the first set of protocol fields includes a field for at least one of a command, an offset, or a byte count.

8. The method of embodiment 6, wherein the first set of protocol fields includes a field that identifies a protocol.

9. The method of embodiment 6, wherein the first set of protocol fields corresponds to at least one of an Ethernet protocol, a TCP protocol, or an IP protocol.

10. The method of embodiment 6, wherein the first set of protocol fields is parsed from the data stream, the method further comprising, after parsing the first set of protocol fields, sending a first result from a first processing unit of the at least one systolic array to a second processing unit, wherein the second processing unit is configured to reassemble multiple packets into an NFS stream.

11. The method of embodiment 10, further comprising parsing the NFS stream to provide a second result, and sending the second result to a cryptographic engine.

12. The method of embodiment 6, further comprising, based on comparing the first set of protocol fields to the plurality of sets of protocol fields, performing a first operation corresponding to a first protocol associated with the first set of protocol fields.

13. The method of embodiment 12, wherein the first operation is performed by a first processing unit in the at least one systolic array, the method further comprising, after completing the first operation, sending a result from the first processing unit to a second processing unit of the at least one systolic array.

14. The method of embodiment 6, wherein the first set of protocol fields corresponds to a first data portion of the data stream, and each set of the plurality of sets of protocol fields is a combination of protocol fields corresponding to data that can be received in the data stream.

15. The method of embodiment 1, wherein each of the data portions is a single byte or a predetermined number of bytes.

16. The method of embodiment 1, wherein the processing of the identified at least one portion is at least one of encryption or authentication.

17. The method of embodiment 1, further comprising determining boundaries within the data stream for the processing of the identified at least one portion.

18. The method of embodiment 17, wherein determining boundaries within the data stream comprises identifying a starting byte of the data stream and an ending byte of the data stream.

19. The method of embodiment 1, wherein at least one FPGA includes the at least one systolic array.

20. The method of embodiment 1, wherein the at least one systolic array is at least one first systolic array, and the identified processing is performed by processing units of at least one second systolic array.

21. The method of embodiment 1, wherein the data stream comprises a packet, the method further comprising:
   searching a header of the packet to determine a protocol used by the packet; and
   identifying, based on the determined protocol, a next processing unit of the at least one systolic array for routing of the packet.

22. The method of embodiment 1, further comprising sending each packet of a plurality of packets from the data stream to a respective next processing unit in the at least one systolic array based on decoding of one or more protocol fields of the packet.

23. The method of embodiment 22, wherein the next processing unit is a protocol decoding unit.

24. The method of embodiment 1, wherein the received data stream is a TCP stream.

25. The method of embodiment 1, further comprising separating data of the incoming stream into blocks based on a protocol associated with a remote storage device in which the blocks will be stored.

26. The method of embodiment 25, further comprising determining sizes of data blocks within the data.

27. The method of embodiment 1 or 26, further comprising identifying at least one protocol field for each of a plurality of data blocks in the data stream.

28. The method of embodiment 1 or 27, further comprising determining a next systolic processing unit in the at least one systolic array, and sending data from the data stream to the determined next systolic processing unit.

29. The method of embodiment 1, further comprising encrypting the identified at least one portion of the data stream using a cryptographic engine.

30. The method of embodiment 1, wherein the data stream is received from a local data device for storage in a remote storage device after processing by the at least one systolic array, and wherein the data stream comprises data blocks.

31. The method of embodiment 30, further comprising:
    after processing the data blocks by the at least one systolic array, storing the data blocks in the remote storage device; and
    reading the data blocks from the remote storage device for protocol decoding by the at least one systolic array.

32. The method of embodiment 31, further comprising, after the protocol decoding, sending the read data blocks to the local data device.

33. A method comprising:
    receiving a data stream comprising data portions;
    parsing, in a systolic array, at least one protocol field for each respective data portion; and
    based on the parsed at least one protocol field for each respective data portion, performing at least one of encrypting the data portion, decrypting the data portion, or guarding the data portion.

34. The method of embodiment 33, wherein at least one FPGA includes the systolic array.

35. The method of embodiment 33, wherein parsing the at least one protocol field comprises identifying a command and determining a length of the command.

36. The method of embodiment 33, further comprising splitting the data stream into parallel processing streams, each parallel processing stream moving through the systolic array, and each parallel processing stream identifying a starting point and an ending point for processing of data in the data stream.

37. The method of embodiment 33, wherein parsing the at least one protocol field comprises identifying a field in a header of a packet that indicates a data type, the method further comprising selecting a next processing unit in the systolic array for processing the packet based on the indicated data type.

38. The method of embodiment 33, wherein the systolic array includes a processing unit that delays a portion of the data stream to arrive at a data manipulation engine at a same time as at least one result from one or more protocol decoding units of the systolic array that corresponds to the delayed portion.

39. The method of embodiment 38, wherein arriving at the same time is arriving on a same clock tick of a system clock used for moving data through the systolic array.

40. A system comprising:
    a packet engine including at least one first field-programmable gate array (FPGA), the packet engine configured to receive incoming packets, and the packet engine comprising at least one systolic array configured to parse a protocol field for each incoming packet, and further configured to process, route, or switch each packet for at least one of encryption or authentication processing based on a result from parsing the protocol field for the respective packet; and
    a cryptographic engine including at least one second FPGA, the cryptographic engine configured to receive each packet from the packet engine, and the cryptographic engine comprising at least one systolic array configured to perform at least one of encryption or authentication processing for the packet.

41. The system of embodiment 40, wherein the packet engine is further configured to:
    determine the boundaries of a data block in a byte stream, wherein the boundaries include a beginning of the data block;
    separate out the data block; and
    send the separated data block to a next processing unit in the at least one systolic array of the packet engine.

42. The system of embodiment 41, wherein the data block is an NFS block, and determining the boundaries includes identifying a command associated with the data block.

43. A system, comprising:
    at least one processor or FPGA; and
    memory storing instructions configured to instruct or program the at least one processor or FPGA to:
        receive, from a local device, a data stream comprising data portions;
        parse, using a systolic array, at least one protocol field for each respective data portion;
        encrypt, based on the respective parsed at least one protocol field, each data portion to provide encrypted data; and
        send the encrypted data to a remote storage device.

44. The system of embodiment 43, wherein the data stream received from the local device includes a data block.

45. The system of embodiment 43, wherein the instructions are further configured to instruct or program the at least one processor or FPGA to set up a transport protocol using at least one certificate received from a certificate authority, wherein the at least one certificate is verified prior to establishing a connection to the local device using the transport protocol.

46. The system of embodiment 45, wherein the instructions are further configured to instruct or program the at least one processor or FPGA to verify the identity of a cloud storage or server using the at least one certificate.

47. The system of embodiment 43, wherein the instructions are further configured to instruct or program the at least one processor or FPGA to set up a transport protocol using at least one certificate received from a certificate authority, and to verify the identity of the remote storage device, wherein the identity is verified prior to establishing a connection to the remote storage device using the transport protocol.

48. The system of embodiment 43, wherein the instructions are further configured to instruct or program the at least one processor or FPGA to:
    receive, from the remote storage device, using a transport protocol, the encrypted data;
    decrypt, using a payload key, the encrypted data to provide decrypted data; and
    send, to the local device, using a transport protocol, the decrypted data.

49. The system of embodiment 43, wherein the instructions are further configured to add at least one protocol field to the encrypted data prior to sending the encrypted data to the remote storage device, wherein the at least one protocol field is used when reading the encrypted data from the remote storage device.

Closing

At least some aspects disclosed can be embodied, at least in part, in software. That is, the techniques may be carried out in a computer system or other data processing system in response to its processor(s), such as a microprocessor, executing sequences of instructions contained in a memory, such as ROM, volatile RAM, non-volatile memory, cache or a remote storage device.

In various embodiments, hardwired circuitry (e.g., one or more hardware processors or other computing devices) may be used in combination with software instructions to implement the techniques above (e.g., the protocol processing system may be implemented using one or more FPGAs and/or other hardware in various types of computing devices). Thus, the techniques are neither limited to any specific combination of hardware circuitry and software nor to any particular source for the instructions executed by the data processing system.

In one embodiment, a computing device may be used that comprises an inter-connect (e.g., bus and system core logic), which interconnects a microprocessor(s) and a memory. The microprocessor is coupled to cache memory in one example.

The inter-connect interconnects the microprocessor(s) and the memory together and also interconnects them to a display controller and display device and to peripheral devices such as input/output (I/O) devices through an input/output controller(s). Typical I/O devices include mice, keyboards, modems, network interfaces, printers, scanners, video cameras and other devices which are well known in the art.

The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system such as the computing device above is used to implement one or more of the following: an encryption appliance or gateway, a router, a switch, a key manager, a client application, cloud storage, a load balancer, and a firewall.

In one embodiment, a data processing system such as the computing device above is used to implement a user terminal, which may provide a user interface for control of a computing device. For example, a user interface may permit configuration of the encryption appliance or gateway. A user terminal may be in the form of a personal digital assistant (PDA), a cellular phone or other mobile device, a notebook computer or a personal desktop computer.

In some embodiments, one or more servers of the data processing system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) and/or the memory above. For example, the functionalities described can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). For example, the encryption appliance can be implemented using one or more FPGAs.

Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Hardware and/or software may be used to implement the embodiments above. The software may be a sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

Software used in an embodiment may be stored in a machine readable medium. The executable software, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

Although some of the drawings may illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that various stages or components could be implemented in hardware, firmware, software or any combination thereof.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
    receiving a data stream;
    providing a first portion of the data stream as an input to a first processing unit in at least one systolic array, the at least one systolic array performing protocol decoding on the first portion of the data stream;
    decoding, by the first processing unit, a first protocol field in the first portion of the data stream;
    determining, based on the decoded first protocol field, a second processing unit of the at least one systolic array to decode a second protocol field in the first portion of the data stream;
    providing at least one output from the at least one systolic array to a data processing engine, the at least one output including at least one decision from the protocol decoding;
    providing a second portion of the data stream to the data processing engine; and
    processing the second portion of the data stream by the data processing engine based on the at least one decision.

2. The method of claim 1, wherein the at least one systolic array comprises a plurality of protocol field decoders, wherein each decoder is connected to at least two other decoders, and wherein a processing result from each decoder determines a route that data being processed moves through the at least one systolic array.

3. The method of claim 1, wherein the at least one systolic array comprises a two-dimensional array of processing units that receives the first data portion, fans out the first data portion to a pipeline of parallel processing units in the two-dimensional array, and moves the first data portion through the pipeline of parallel processing units.

4. The method of claim 3, wherein the first portion of the data stream moves through the pipeline by advancing from one processing unit to another processing unit on each of a plurality of clock ticks.

5. The method of claim 1, further comprising comparing, by the at least one systolic array, a first set of protocol fields in the first portion of the data stream to a plurality of sets of protocol fields.

6. The method of claim 1, further comprising providing a predetermined delay to the second portion of the data stream, wherein the second portion of the data stream and the at least one output arrive at the data processing engine at a same time.

7. The method of claim 1, wherein the protocol decoding separates the first portion of the data stream into blocks based on protocols built in the first portion of the data stream.

8. The method of claim 1, wherein each of the first and second processing units is compiled for a predetermined protocol.

9. A system comprising:
    a receiver configured to receive a data stream and output a first and a second portion of the data stream;
    a protocol decoding processor configured to receive the first portion of the data stream and output at least one decision based on protocol decoding on the first portion of the data stream, the protocol decoding processor including a first and second processing unit in at least one systolic array to perform the protocol decoding, wherein the first processing unit is configured to decode a first protocol field in the first portion of the data stream and determine, based on the decoded first protocol field, the second processing unit in the at least one systolic array to decode a second protocol field in the first portion of the data stream; and
    a data processing engine configured to receive the second portion of the data stream and process the second portion of the data stream based on the at least one decision.

10. The system of claim 9, wherein the at least one systolic array comprises a plurality of protocol field decoders, wherein each decoder is connected to at least two other decoders, and wherein a processing result from each decoder determines a route that data being processed moves through the at least one systolic array.

11. The system of claim 10, wherein the at least one systolic array comprises a two-dimensional array of processing units that receives the first data portion, fans out the first data portion to a pipeline of parallel processing units in the two-dimensional array, and moves the first data portion through the pipeline of parallel processing units.

12. The system of claim 11, wherein the first portion of the data stream moves through the pipeline by advancing from one processing unit to another processing unit on each of a plurality of clock ticks.

13. The system of claim 9, wherein the protocol decoding processor is further configured to compare, by the at least one systolic array, a first set of protocol fields in the first portion of the data stream to a plurality of sets of protocol fields.

14. The system of claim 9, wherein the protocol decoding processor is further configured to provide a predetermined delay to the second portion of the data stream, and wherein the second portion of the data stream and the at least one output arrive at the data processing engine at a same time.

15. The system of claim 9, wherein the protocol decoding separates the first portion of the data stream into blocks based on protocols built in the first portion of the data stream.

16. The system of claim 9, wherein each of the plurality of processing units is compiled for a predetermined protocol.

17. A method comprising:
receiving a data stream;
providing a first portion of the data stream as an input to a first processing unit in at least one systolic array, the at least one systolic array performing protocol decoding on the first portion of the data stream;
decoding, by the first processing unit, a first protocol field in the first portion of the data stream;
determining, based on the decoded first protocol field, a second processing unit of the at least one systolic array to decode a second protocol field in the first portion of the data stream;
providing at least one output from the at least one systolic array to a data processing engine, the at least one output including at least one decision from the protocol decoding;
providing a second portion of the data stream to the data processing engine with a predetermined delay; and
processing the second portion of the data stream by the data processing engine based on the at least one decision.

18. The method of claim 17, wherein the second portion of the data stream and the at least one decision arrive at the data processing engine at a same time.

* * * * *